United States Patent [19]

Cone

[11] Patent Number: 5,195,715
[45] Date of Patent: Mar. 23, 1993

[54] CHRISTMAS TREE HOLDER

[75] Inventor: Richard E. Cone, Dayton, Ohio

[73] Assignee: Mitchell Associates, Paso Robles, Calif.

[21] Appl. No.: 826,530

[22] Filed: Jan. 27, 1992

[51] Int. Cl.⁵ .......................................... F16M 13/00
[52] U.S. Cl. ................................................... 248/526
[58] Field of Search ............... 248/526, 523, 524, 519, 248/514, 525; 47/40.5

[56] References Cited

U.S. PATENT DOCUMENTS

| | | | |
|---|---|---|---|
| 2,681,780 | 6/1954 | Santoro | 47/40.5 |
| 2,847,175 | 8/1958 | Farley et al. | 248/527 |
| 4,007,901 | 2/1977 | Mancini et al. | 47/40.5 X |
| 4,771,978 | 9/1988 | Lofquist et al. | 248/526 |
| 4,834,335 | 5/1989 | Attar | 248/526 |
| 4,949,502 | 8/1990 | Anderson | 47/40.5 |
| 5,002,252 | 3/1991 | Setala et al. | 248/523 |
| 5,118,067 | 6/1992 | Gillanders | 248/527 |

*Primary Examiner*—Ramon O. Ramirez
*Attorney, Agent, or Firm*—Daniel C. McKown

[57] ABSTRACT

A tree holder, suitable for holding the trunk of a cut-off tree in an upright attitude includes a cup into which the lower end of the trunk is placed, the cup having a lip from which a skirt extends downwardly and outwardly. The skirt has the shape of a frustrum of a cone. Three legs are slidably attached to the skirt on its inside, and each leg can be slid toward and away from the vertex of the cone independently. Each leg is slid upwardly with respect to the skirt until the upper end of the leg is in firm contact with the trunk of the tree. At that point, the skirt and the leg are drawn together by tightening a threaded fastener, thereby clamping the leg to the skirt. The tree holder is notable for its simplicity of design and for its ability to accommodate asymmetric and crooked tree trunks.

3 Claims, 2 Drawing Sheets

CHRISTMAS TREE HOLDER

BACKGROUND OF THE INVENTION

1. Field of the Invention

The present invention is in the field of Christmas tree holders, and specifically relates to a Christmas tree holder of simple design in which the legs of the holder extend above a water receptacle to grasp and to steady the tree.

2. The Prior Art

In U.S. Pat. No. 2,464,593 Lorenzen describes a Christmas tree holder in which, when the tree is inserted into a conical cup, a set of jaws move in slots to grasp the tree, and because of the weight of the tree, the trunk gripping elements cause the gripping jaws to bite into the tree trunk.

In U.S. Pat. No. 2,592,561 Greenwood shows a base suitable for supporting a Christmas tree in which certain jaw portions will grip the tree more tightly, the heavier the tree is.

In U.S. Pat. No. 3,301,512, Nyberg shows a Christmas tree holder in which the weight of the tree causes a set of toothed jaws to bit into the trunk of the tree.

The Christmas tree holders described in these patents operate on the same general principal as the present invention, but are implemented in a much more complex manner than the present invention.

Tree holders that use wedges to grip the tree trunk and to hold it upright are described in U.S. Pat. No. 2,609,169 of Kroeger; and U.S. Pat. No. 3,302,909 of Glassman and in U.S. Pat. No. 4,261,138 of St. George Syms.

Tree holders in which radially-extending screws are used to grip the tree trunk are shown in U.S. Pat. No. 2,237,513 of Timko and in U.S. Pat. No. 4,825,586 of Coppedge.

None of the inventions described in the above patents is as simple as the present invention.

SUMMARY OF THE INVENTION

It is a first objective of the present invention to provide a tree holder that is simple and easy to use.

It is a further objective of the present invention to provide a tree holder that can easily accommodate trees having bent or odd-shaped trunks.

As in many other tree holders, the cut off tree trunk rests in a cup which can be filled with water to prolong the useful life of the tree. In accordance with a preferred embodiment of the present invention, the cup is provided with a surrounding skirt that extends downwardly and outwardly from the lip of the cup, and that includes grooves to permit legs to slide upwardly and downwardly with respect to the skirt. Because the skirt and the legs are inclined at an angle to the horizontal, as the legs slide upwardly with respect to the skirt, they also move radially inwardly until they come in contact with the trunk of the tree. Once the upper part of each leg is in firm contact with the trunk of the tree, the position of the leg with respect to the skirt is fixed by tightening a screw associated with that leg. In the preferred embodiment, three legs are used, but in other embodiments more than three legs may be used.

If the tree trunk is not perfectly cylindrical, but instead is bowed away from one of the legs, that leg can be moved independently of the other legs upwardly and inwardly with respect to the cup until the upper end of the leg contacts the bowed tree trunk. Although this will result in the skirt being slightly unlevel, no harm is caused, because the tree holder is normally hidden from view by a sheet or blanket and the water-containing cup is sufficiently deep that its capacity is not appreciably affected by the slight tilting. The stability of the tree holder is unaffected because it makes a three-point contact with the floor, in the preferred embodiment.

The larger the diameter of the tree the broader the area spanned by the legs, and the shorter the extension of the legs above the cup. In instances the stand increases in strength and stability, the larger the tree.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 2:
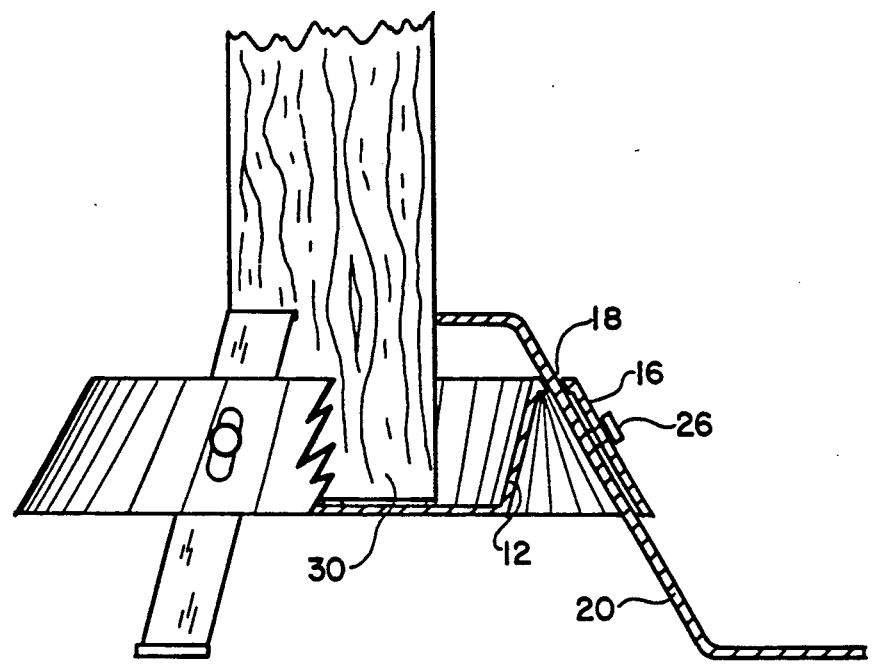
FIG. 2 is a side elevational cross sectional view of the tree holder of FIG. 1 showing how the legs are movable to a second position, shown in phantom lines, to grip the trunk of a tree.
Figure 1:
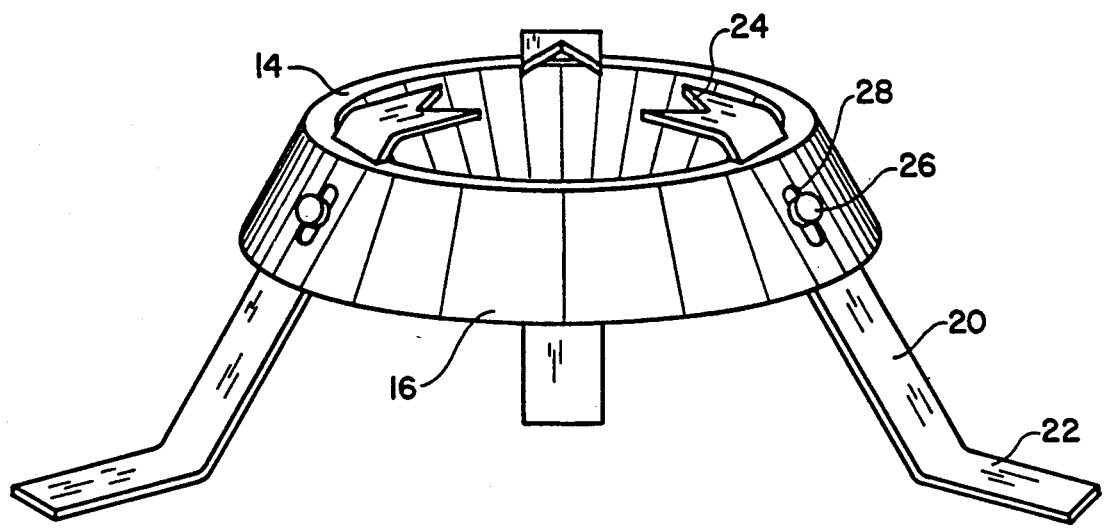
FIG. 1 is a perspective view showing a preferred embodiment of the tree holder of the present invention.

FIGS. 1 and 2 show a preferred embodiment of the tree holder of the present invention. The tree holder includes a cup 12 having a lip 14. A skirt 16 is connected to the lip 14 of the cup and slopes downwardly and radially outwardly from the lip 14.

The skirt 16 has the shape of a frustrum of an imaginary cone having a vertex located above the tree holder. The lip 14 includes apertures of which the aperture 18 is typical, to permit the legs, of which the leg 20 is typical, to pass through. The leg 20 includes a lower radially outwardly extending foot 22 and an upper portion terminating in a jaw 24.

The bolt 26 extends through the slot 28 and is threaded into the leg 20.

As best seen in FIG. 2, when the leg 20 is to be adjusted, the bolt 26 is loosened, permitting the leg 20 to slide in the direction of the vertex of the imaginary cone.

As can be seen in FIG. 2, moving the leg 20 upward with respect to the skirt 16 causes the jaws 24 to move radially inwardly until they contact the trunk 30 of the tree. In this manner, trunks of various diameters can be accommodated. In all cases, the trunk remains seated in the cup 12, but for large diameters, the cup is further from the plane defined by the three feet 22.

The structure of the tree holder of the present invention facilitates installing the trunk in the holder. Starting with the jaws 24 wide open, the trunk is seated in the cup 12 while being held in an upright attitude. The weight of the tree pressing against the bottom of the cup 12 tends to encourage the skirt 16 to slide down along the legs 20 until the jaws 24 contact the trunk 30. The heavier the tree is, the more forcefully the jaws will push against it. Once the jaws are firmly in contact with the trunk 30, the bolts 26 are tightened thereby clamping the skirt 16 to the legs 20 so that further movement is not possible.

Figure 3:
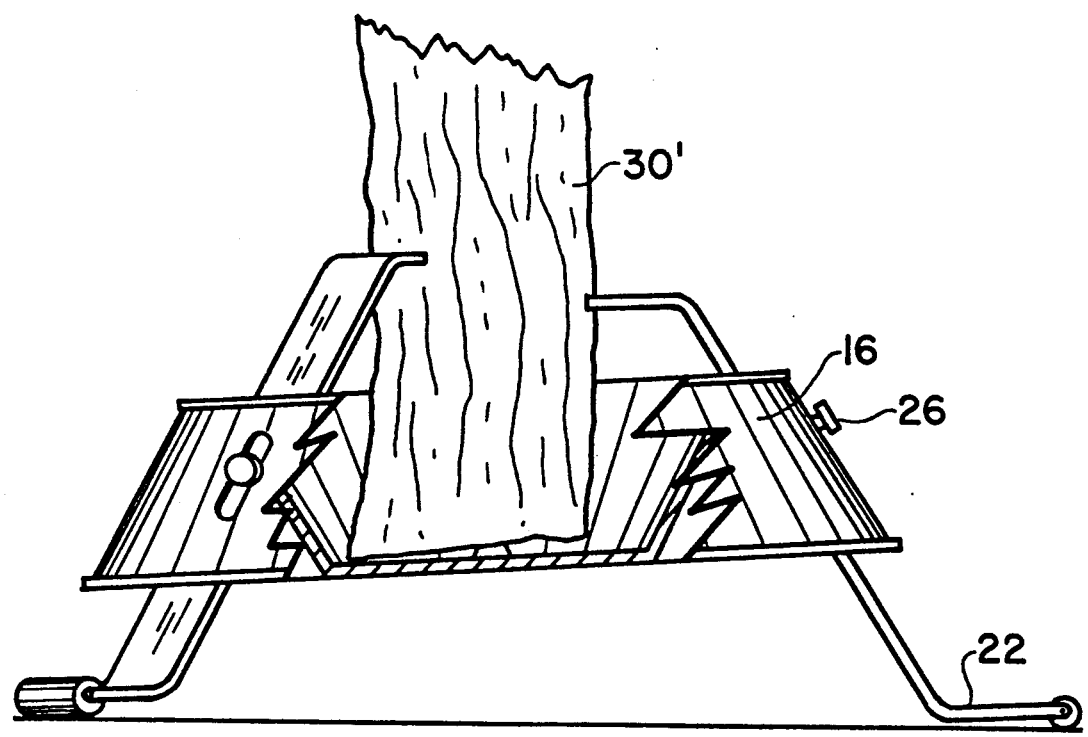
FIG. 3 is a side elevational view partly cut away to show how the tree holder of FIG. 1 grips a crooked tree trunk; and, FIG. 4 is a side elevational view showing a leg used in an alternative embodiment of the tree holder of FIG. 1.

FIG. 3 shows the situation in which the trunk 30 of the tree is not perfectly cylindrical. In this case, each leg moves upwardly with respect to the skirt 16 until it makes contact with the trunk 30.

Figure 4:
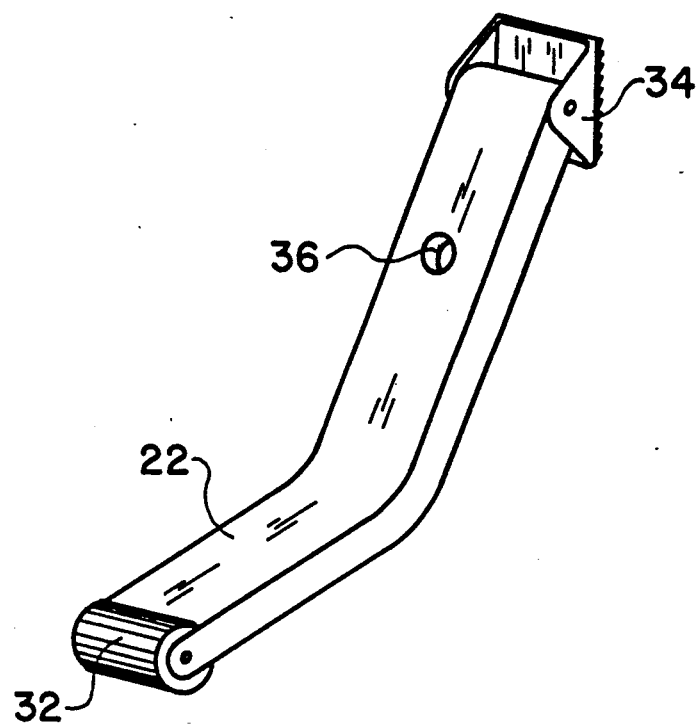

FIG. 4 shows a leg of a type used in an alternative embodiment. A roller 32 is mounted on the foot of the leg, and instead of a jaw, the upper end of the leg is provided with a pivotable gripper 34. The threaded insert 36, which receives the bolt 26 remains the same as in the embodiment of FIGS. 1 and 2.

The shape of the skirt 16 as well as the placement of the legs 20 inside the skirt rather than outside it prevents the legs from rotating about the bolt 26.

Several variations of the preferred embodiment are considered to be within the scope and spirit of the present invention. In a first variation, the lip 14 of the cup 12 is more narrow or not present at all, in which case, the leg 20 extends through an aperture in the upper part of the cup.

In another variation, the bolts 26 are replaced by studs that extend inwardly from the skirt 16 and which pass through slots that extend through the legs. A wing nut is used to secure the leg on the stud in this variation.

In yet another variation, the feet 22 are shortened or omitted, but it should be noted that longer feet result in greater stability.

Because the legs are identical, the tree holder of the present invention really consists of only two major parts, namely, the cup and skirt, and the leg. Thus, only two molds are required when the tree holder is made of a plastic by a molding technique.

Thus, there has been described a tree holder that is notable for its simplicity as well as its ability to accommodate a crooked or a asymmetric tree.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A holder for supporting in an upright position a tree that has been cut off at its trunk, said holder comprising:
    a cup having a bottom and a lip;
    a skirt connected to the lip of said cup, sloping downwardly and outwardly from the lip, and having the shape of a frustrum of a cone, the cone having a generally vertical axis and a vertex located above said skirt;
    at least three legs spaced circumferentially around said skirt, each having a lower end, an inclined central portion, and an upper portion directed inwardly toward the axis of said skirt;
    means coupling said skirt to said at least three legs for independently sliding each leg with respect to said skirt in a direction toward and away from the vertex of the cone and for temporarily affixing each leg to said skirt at a chosen position;
    whereby, with the trunk of the tree resting on the bottom of said cup, said at least three legs may be slidably adjusted so that the upper portion of each leg bears against the trunk of the tree to steady the tree in an upright attitude, and whereby the lower ends of said at least three legs are more widely spaced when adjusted for a large tree than when adjusted for a small tree.

2. A holder for supporting in an upright position a tree that has been cut off at its trunk, said holder comprising:
    a cup having a bottom and a lip;
    a skirt connected to the lip of said cup, sloping downwardly and outwardly from the lip, and having the shape of a frustrum of a cone, the cone having a generally vertical axis and a vertex located above said skirt;
    at least three legs spaced circumferentially around said skirt, each having a lower end, an inclined central portion, and an upper portion directed inwardly toward the axis of said skirt;
    means including at least three slots in said skirt elongated in the direction of the vertex and spaced around said skirt, and further including at least three blots and each passing through one of said at least three slots and each threaded into the inclined central portion of one of said at least three legs for enabling each of said least three legs to be slid independently with respect to said skirt in a direction toward and away from the vertex of the cone and for enabling each of said at least three legs to be temporarily affixed to said skirt at a chosen position;
    whereby, with the trunk of the tree resting on the bottom of said cup, said at least three legs may be adjusted so that the upper portion of each leg bears against the trunk of the tree to steady the tree in an upright attitude, and whereby the lower ends of said at least three legs are more widely spaced when adjusted for a large tree than when adjusted for a small tree.

3. A holder for supporting in an upright position a tree that has been cut off at its trunk, said holder comprising:
    a cup having a bottom and a lip;
    a skirt connected to the lip of said cup, sloping downwardly and outwardly from the lip, and having the shape of a frustrum of a cone, the cone having a generally vertical axis and a vertex located above said skirt;
    at least three legs spaced circumferentially around said skirt, each having a lower end, an inclined central portion, and an upper portion directed inwardly toward the axis of said skirt;
    means including an elongated slot in the inclined central portion of each of said at lest three legs and further including at least three studs attached to said skirt at locations spaced around said skirt, one of said at least three studs extending through the elongated slot of each of said at least three legs for enabling each of said at least three legs to be slid independently with respect to said skirt in a direction toward and away from the vertex of the cone and for enabling each of said at least three legs to be temporarily affixed to said skirt in a chosen position;

whereby, with the trunk of the tree resting on the bottom of said sup, said at least three legs may be adjusted so that the upper portion of each leg bears against the trunk of the tree to steady the tree in an upright attitude, and whereby the lower ends of said at least three legs are more widely spaced when adjusted for a large tree than when adjusted for a small tree.

* * * * *